United States Patent [19]
Rom

[11] Patent Number: 5,102,320
[45] Date of Patent: Apr. 7, 1992

[54] APPARATUS FOR THE PRODUCTION OF A TUBULAR FILM FROM THERMOPLASTIC MATERIAL

[76] Inventor: Israel Rom, Kibutz Ginegar 30 053, Israel

[21] Appl. No.: 537,306

[22] Filed: Jun. 12, 1990

[30] Foreign Application Priority Data

Jun. 15, 1989 [IL] Israel .................. 90625

[51] Int. Cl.⁵ .................. B29C 47/88
[52] U.S. Cl. .................. 425/72.1; 425/326.1; 425/387.1
[58] Field of Search .................. 425/72.1, 326.1, 387.1; 264/565

[56] References Cited

U.S. PATENT DOCUMENTS

| | | | |
|---|---|---|---|
| 3,445,891 | 5/1969 | Thordarson | 425/72.1 |
| 3,488,809 | 1/1970 | James | 425/72.1 |
| 4,080,143 | 3/1978 | Upmeier | 425/72.1 X |
| 4,115,048 | 9/1978 | Alderfer et al. | 425/326.1 X |
| 4,176,155 | 11/1979 | Heisterkamp et al. | 425/72.1 X |

FOREIGN PATENT DOCUMENTS

| | | |
|---|---|---|
| 1211379 | 2/1966 | Fed. Rep. of Germany . |
| 1504804 | 9/1969 | Fed. Rep. of Germany . |
| 1629692 | 1/1971 | Fed. Rep. of Germany . |
| 1504725 | 6/1971 | Fed. Rep. of Germany . |
| 1704573 | 12/1972 | Fed. Rep. of Germany . |
| 2036834 | 9/1974 | Fed. Rep. of Germany . |
| 1072174 | 6/1967 | United Kingdom . |

Primary Examiner—Richard L. Chiesa
Attorney, Agent, or Firm—Herbert Dubno

[57] ABSTRACT

An apparatus for the production of a tubular film from thermoplastic material which is thermoplasticized in an upstream extruder. The apparatus includes a die-head, an annular die for the continuous extrusion of a thermoplasticized plastic tube, a device for inflating the plastic tube to a tubular film bubble which is continuously hauled-off, and a cooling air cooling device for internal cooling of the tubular film bubble above the annular die. The cooling air cooling device includes a cooling unit and a circulating unit for the cooling air. The cooling air cooling device has an annular cooling chamber which is provided with a die bottom shaped to conform to the tubular film bubble for the exhaust of the cooling air. The cooling unit includes a heat exchanger with which the circulating unit is combined. The heat exchanger on the one hand is in connection with the interior of the tubular film bubble and is connected on the other hand to a channel system leading to the annular cooling chamber.

6 Claims, 1 Drawing Sheet

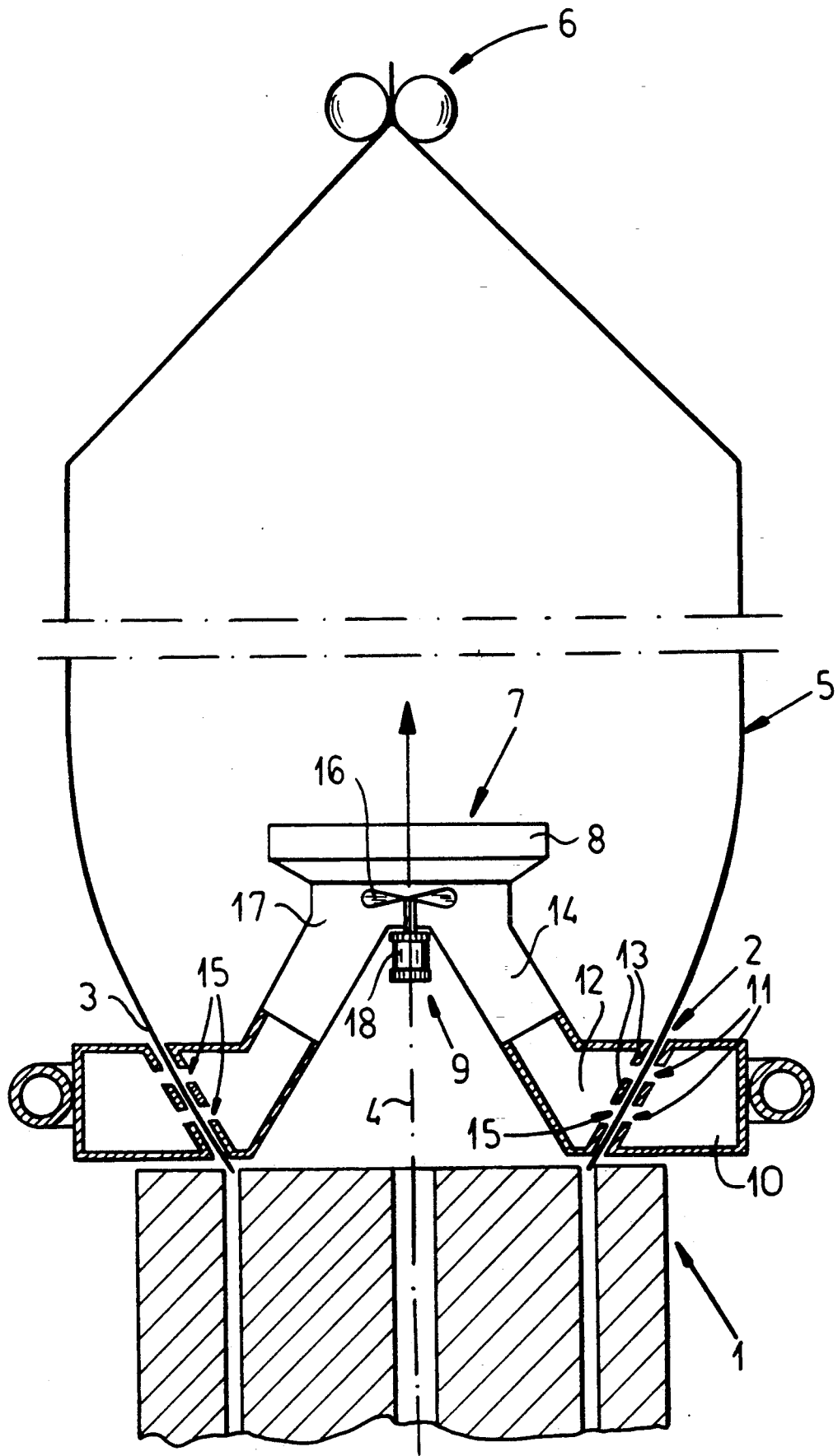

APPARATUS FOR THE PRODUCTION OF A TUBULAR FILM FROM THERMOPLASTIC MATERIAL

My present invention relates to an apparatus for the production of a tubular film from thermoplastic material which is thermoplasticized in an upstream extruder, including
 a die-head,
 an annular die for the continuous extrusion of a thermoplasticized plastic tube,
 a device for inflating the plastic tube to a tubular film bubble which is continuously hauled-off, and
 a cooling air cooling device for internal cooling of the tubular bubble above the annular die.

The cooling air cooling device includes a cooling unit and a circulating unit for the cooling air. It goes without saying that for such units a facility for the external cooling of the tubular film bubble is regularly provided. Within the scope of the invention, the die-head can be alternately to intermittently stationary or can rotate continuously or alternately.

BACKGROUND OF THE INVENTION

In the known apparatus of the present invention (DE-AS 12 11 379), the cooling unit for the internal bubble cooling is a cooling water tank with a cylindrical upper part which is adapted to the tubular film bubble and provided with cooling water supply and drain pipes. The cooling attainable in this way is not sufficient in up-to-date units for the production of tubular film and furthermore it is frequently not sufficiently uniform across the circumference of the tubular film bubble. This applies also to a similar type of design (GB-PS 10 72 174) which works with helically guided cooling spirals. By the way, devices of the first described design (DE-AS 12 11 379, GB-PS 10 72 174) are known in which so-called support air is used for inflating the thermo-plasticized plastic tube to a tubular film bubble and only leakage losses are readjusted. However, other devices are known which work with so-called blowing air (DE-OS 23 06 834) and wherein a large mass flow of cooled blowing air is conveyed into the tubular film bubble for internal cooling and an adequate mass flow of air is exhausted out of the tubular film bubble so that cooling is effected by means of the cooled air stream supplied and exhaust is made in a way to allow the tubular film bubble to remain inflated. The obtained cooling effect depends here on the controllability of the mass flows without affecting or even destroying the tubular film bubble.

OBJECT OF THE INVENTION

It is the object of the invention to provide an improved apparatus of the first described design in order to achieve a considerably better cooling.

SUMMARY OF THE INVENTION

This object is attained, according to the invention, with an apparatus wherein the cooling air cooling device has an annular cooling chamber which is provided with a bottom shaped to conform to the tubular film bubble for the cooling air escape. The cooling unit is equipped with a heat exchanger with which the circulating unit is combined. The heat exchanger which, on the one hand is in connection with the interior of the tubular film bubble, is connected on the other hand to a channel system leading to the annular cooling chamber.

The invention is based on the finding that an intensive internal bubble cooling requires be an air cooling, that for this purpose the air must cooled inside the tubular film bubble or cooled additionally and that an annular cooling chamber is required for the controlled exhaust of the cooled air. Simultaneously, a very uniform cooling is attained when the annular cooling chamber is provided with a die bottom shaped to conform to the tubular film bubble as described before.

A preferred embodiment of the invention which allows adaptation of the apparatus according to the invention to different operating conditions and especially to different plastic materials and different wall thicknesses of the tubular film, has the die bottom formed with adjustable die orifices, e.g. in the form of slot dies arranged around. By adjusting these dies, a uniform cooling across the entire circumference of the tubular film bubble can be achieved.

A preferred embodiment of the invention which gives a very high cooling efficiency has the cooling unit is arranged with its cold section inside the tubular film bubble and with its hot section outside the tubular film bubble and outside the die-head. The heat exchanger is preferably formed as a bar grate or a plate grate so that a very large heat exchanger surface can be offered to the air stream to be cooled. This surface can be equipped with cooling fins. The circulating unit can be arranged above the heat exchanger in the tubular film bubble.

According a preferred embodiment of the invention, the circulating unit includes a for which is arranged below the heat exchanger in a chamber covered at the same time by the heat exchanger and connected to the channel system. The drive of the circulating unit is preferably arranged outside the tubular film bubble and below the die-head. In this way, the cooling is not affected by the waste heat of the drive motor for the circulating unit. Since this drive rating is low, good results can also be obtained if the drive of the circulating unit is arranged inside the tubular film bubble.

According a preferred embodiment of the invention, not only the die orifices can be controlled or adjusted pursuant to the different operating conditions but also the cooling capacity of the cooling unit and/or the capacity of the circulating unit can be controlled.

The device for inflating the plastic tube to a tubular film bubble can work in the apparatus according to the invention with support air which is circulated in the tubular film bubble and cooled as described herein. This type of design merely compensates leakage losses. It is also possible, to use device for inflating the plastic tube to a tubular film a supply of blowing air, preferably a supply of cooled blowing air, and to exhaust blowing air from the bubble, whereby an appropriate mass flow of this blowing air leaves the bubble afterwards. Irrespective of this mass flow, a part of the blowing air is circulated in the explained manner as cooling air and conveyed as described via the heat exchanger and the annular chamber with the die bottom provided for the exhaust of the cooling air. Here, a particularly intensive cooling can be attained since two cooling systems are combined, i.e. one for the cooled blowing air supplied and the other inside the tubular film bubble.

BRIEF DESCRIPTION OF THE DRAWING

The invention is explained in greater detail below by means of a drawing, the sole FIGURE of which is a schematic vertical cross sectional view of an apparatus according to the invention.

DESCRIPTION OF THE PREFERRED EMBODIMENT

The apparatus shown in the FIGURE serves for the production of a tubular film from thermoplastic material which is thermoplasticized in an upstream extruder (not shown). The basic construction of the apparatus includes a diehead 1, an annular die 2 for the continuous extrusion of the thermoplasticized plastic tube 3, a device 4 only indicated by a dash-dot arrow line for inflating the plastic tube to a tubular film bubble 5, which is continuously hauled-off, e.g. by nip rolls 6, and a cooling air cooling device 7 for the internal cooling of the tubular film bubble 5 above the annular die 2. The cooling air cooling device 7 includes a cooling unit 8 and a circulating unit 9 for the cooling air. It goes without saying that an external cooling takes place as well, i.e. with blowing air that is conveyed to a circular channel 10 provided with nozzle orifices 11 for the external cooling. The external cooling air can be cooled in a special cooling unit.

The cooling air cooling device 7 for the internal cooling includes an annular cooling chamber 12 which is provided with an apertured bottom 13 shaped to conform to the tubular film bubble for the exhaust (discharge) of the cooling air. The cooling unit 8 consists of a heat exchanger combined with the circulating unit 9. The heat exchanger 8, which on the one hand is in connection with the interior of the tubular film bubble 5, is connected on the other hand to a channel system 14 leading to the annular cooling chamber 12. It goes without saying that the nozzle orifices 15 in the apertured bottom 13 my be adjustable in a manner which has not been illustrated. The nozzle orifices 15 in the apertured 13 may be slot orifices in the embodiment shown. The hot section of the cooling unit 8 has not been illustrated. It is arranged outside the tubular film bubble 5. The coolant is fed to the heat exchanger 8 via borcholes and hose pipes which are adequately heat insulated. The heat exchanger 8 may be a bar grate or a plate grate allowing the coolant to pass through the bars or plates.

In the embodiment shown and according to the preferred type of design of the invention, the circulating unit 9 includes a fan 16, which is arranged below the heat exchanger 8 in a chamber 17 covered at the same time by the heat exchanger and connected to the channel system 14. The drive 18 of the circulating unit 9 is located in the illustrated embodiment inside the tubular film bubble 5 below the above mentioned chamber 17. The drive could, however, also have a shaft whose drive motor is outside the tubular film bubble 5 so that the waste heat of the drive motor does not get into the tubular film bubble 5. The cooling capacity and/or the capacity of the circulating unit 9 are controllable or adjustable pursuant to the different operating conditions.

I claim:

1. An apparatus for producing a tubular film from a thermoplastic material, comprising:
   a die head connectable to an extruder for thermoplasticizing thermoplastic material and formed with an annular extrusion die from which a continuous thermoplasticized plastic tube is extruded in an extrusion direction;
   means for inflating said tube downstream of said head to a tubular film bubble having an outwardly spreading shape adjacent said die head;
   a device spaced from said die head for continuously hauling off a tubular film from said bubble;
   a heat exchanger disposed downstream of said die head and upstream of said device within said bubble for cooling circulated air within said bubble;
   a circulating unit disposed within said bubble for circulating air within said bubble through said heat exchanger, said circulating unit including a fan chamber axially adjacent said heat exchanger and a circulating fan in said chamber;
   an inner annular cooling chamber within said bubble having a wall of substantially said shape juxtaposed with an inner surface of said bubble and provided with outlet orifices;
   channels connecting said fan chamber with said cooling chamber for discharging through said orifices air cooled by said heat exchanger and circulated by said circulating unit; and
   an outer annular cooling chamber surrounding said bubble and having an outer wall of substantially said shape opposite said wall of said inner cooling chamber, said outer wall being apertured and said outer cooling chamber being supplied with cooling air.

2. The apparatus defined in claim 1 wherein said outlet orifices are slots spaced apart around said inner surface of said bubble on said wall of said inner cooling chamber.

3. The apparatus defined in claim 1 wherein said heat exchanger is a bar-grate heat exchanger.

4. The apparatus defined in claim 1 wherein said heat exchanger is a plate-grate heat exchanger.

5. The apparatus defined in claim 1 wherein said circulating unit has a drive disposed inside said tubular film bubble.

6. The apparatus defined in claim 1 wherein said die is formed with means for inflating said tubular film bubble by a supply of cooled blowing air.

* * * * *